United States Patent [19]

Rudolph

[11] 4,353,517
[45] Oct. 12, 1982

[54] FLAP ASSEMBLY FOR AIRCRAFT WING

[75] Inventor: Peter K. C. Rudolph, Seattle, Wash.

[73] Assignee: The Boeing Company, Seattle, Wash.

[21] Appl. No.: 194,768

[22] Filed: Oct. 7, 1980

[51] Int. Cl.³ ............................................... B64C 3/48
[52] U.S. Cl. ................................................... 244/216
[58] Field of Search ............... 244/213, 212, 215, 216, 244/218, 219

[56] References Cited

U.S. PATENT DOCUMENTS

| | | | |
|---|---|---|---|
| 2,222,435 | 11/1940 | Ksoll | 244/216 |
| 2,289,704 | 7/1942 | Grant | 244/216 |
| 3,874,617 | 4/1975 | Johnson | 244/216 |
| 3,985,319 | 10/1976 | Dean et al. | 244/216 |
| 3,987,983 | 10/1976 | Cole | 244/216 |

FOREIGN PATENT DOCUMENTS

| | | | |
|---|---|---|---|
| 1296527 | 5/1969 | Fed. Rep. of Germany | 244/216 |
| 2050808 | 4/1972 | Fed. Rep. of Germany | 244/216 |
| 838625 | 3/1939 | France | 244/216 |
| 999786 | 2/1952 | France | 244/216 |

Primary Examiner—Galen L. Barefoot
Attorney, Agent, or Firm—Robert B. Hughes; H. Gus Hartmann; Bernard A. Donahue

[57] ABSTRACT

An airfoil having a trailing edge flap assembly comprising a fore flap and an aft flap. A fixed mounting structure is positioned below the flaps when in their stowed position, and there is a first common link pivotally connected to the mounting structure and to each of the two flaps. A second link interconnects the mounting structure with the fore flap, and a third link connects a mounting arm of the fore flap to the aft flap. Thus, the common link forms with the second link and upwardly extending four-bar linkage to move the fore flap to its deployed position, and the common link forms with the third link a second upwardly extending four-bar linkage which deploys the aft flap to its extended position.

34 Claims, 8 Drawing Figures

FLAP ASSEMBLY FOR AIRCRAFT WING

BACKGROUND OF THE INVENTION

The present invention relates to a flap assembly particularly adapted for the trailing edge of a wing of an airplane with requirements for relatively short take-off and landing field length.

It is quite common for present commercial aircraft to have single, double or triple slotted flaps that travel in curved tracks. While this arrangement does provide optimum flap positions for take-off and landing with only small low-drag fairings, the flap track supports are heavy and have inherent in-service problems with track wear and jamming. The main problem arises from the line contact of the highly loaded aft-roller on the track. Another arrangement is used in one configuration of the Boeing 747 airplane, where there is a single slotted flap mounted on an overhead four-bar linkage.

Some short to medium range airplanes are equipped with double slotted flaps, mounted from a simple hinge below the wing. This flap configuration is designed to provide very high lift coefficients for landing with take-off lift coefficient and lift-to-drag ratio not being critical. In this particular airplane configuration, the cruise drag of the deep flap support fairings is not too important for the short range mission.

There is need for improvement for mission requirements where there is relatively high gross weight, high altitude, and limited runway length in that there should be an adequately high lift-to-drag ratio for take-off. For a mix of mission requirements, short and long range, with high gross weight and intermediate runway length, intermediate gross weight and short field length, a flap system with the aerodynamic characteristics of the track guided flaps is desirable.

There have been proposals for a flap system having the desirable features of the track guided flaps, while alleviating some of the difficulties associated with such track guided flaps. Specifically, consideration has been given to flap assembly configurations which provide adequate Fowler motion for various flap angles, while requiring only a small flap support fairing with low cruise drag. With regard to prior proposals known to the applicant, the rather sophisticated flap motion is accomplished with an equally sophisticated linkage system. This complexity involves increased expense in terms of manufacturing and rigging. Having a relatively large number of links which act in series increases probability of failure as well as wear in the multiple pivot points. Thus, there remains a need for improved design for flap configuration employing a relatively simple linkage arrangement, while having a desirable mix of advantageous features as indicated above.

A search of the patent literature has disclosed a number of patent, U.S. and foreign, showing various arrangements for deploying the flap members. Typical of these are the following.

U.S. Pat. No. 2,137,879, Ksoll, shows a trailing edge flap system where there is a fore flap and an aft flap. In one of the arrangements, the fore flap is mounted by an upwardly extending four-bar linkage, and the aft flap is mounted from the fore flap by a downwardly extending four-bar linkage.

U.S. Pat. No. 2,155,546, Hill et al, shows a trailing edge flap configuration where a fore flap is pivotally connected to the wing, and an aft flap is pivotally connected to the fore flap.

U.S. Pat. No. 2,289,704, Grant, shows a flap configuration where there are two flaps. The fore flap is hinge-connected to the wing, and there is a slave linkage assembly to achieve slot control and aileron functions.

U.S. Pat. No. 2,404,956, Gouge, deploys a set of trailing edge flaps by means of long screws which, when turned, move the flaps to their extended locations.

U.S. Pat. No. 2,518,854, Badenoch, shows a main flap extended from an overhead four-bar linkage. There is also a smaller intermediate flap which functions as an "interfoil".

U.S. Pat. No. 2,583,405, Youngman, discloses a trailing edge assembly where there is an overhead four-bar linkage for the fore flap. An aileron is added to the fore flap.

U.S. Pat. No. 3,767,140, Johnson, has a relatively complex crank linkage for the main flap. The aft flap moves on a curved track mounted in the main flap.

U.S. Pat. No. 3,799,474, Scharzler, shows a flaperon with two hinged elements that can move either together or separately.

U.S. Pat. No. 3,827,657, Schwarzler, has a main flap which is hinge mounted to the wing. Also, there are two smaller flaps mounted to the main flap.

U.S. Pat. No. 3,874,617, Johnson, discloses a flap configuration such as that which is used on the YC-14 flap system. There are two downwardly extending links that mount the main flap to the wing structure, and the rear link also serves as the forward link for the second flap. A third link interconnects the fore flap with the aft flap. While analysis indicates that the Fowler motion, slot size and flap rotation angles are desirable, the loads on the links and the actuation loads are undesirably high.

U.S. Pat. No. 3,917,192, Alvarez-Calderon, shows leading and trailing edge devices which are hinged with folding trusses for low actuation loads.

U.S. Pat. No. 3,985,319 and U.S. Pat. No. 4,049,219, Dean et al, have trailing edge flap configurations which utilize a four-bar linkage for the main flap. There is a pivot for the aft flap with a slave link mechanism.

French Pat. No. 838,625 employs an overhead four-bar linkage for fore and aft flaps in a trailing edge flap configuration.

French Pat. No. 995,545 employs an overhead four-bar linkage for the main and aft flaps, with one of the links being a common link. An additional pivot point adds aileron-spoiler function.

French Pat. No. 999,786 discloses a trailing edge flap configuration where there is a relatively complex rocker arm linkage for the main flap for flaperon-spoiler functions. There is a simple pivot for the aft flap, and two actuation systems are provided.

German Pat. No. 1,296,527 discloses a flaperon arrangement with two actuating systems.

In view of the foregoing, it is an object of the present invention to provide a flap system for an airfoil of an aircraft, where there is a relatively simple linkage mechanism having a desirable mix of advantageous features.

SUMMARY OF THE INVENTION

The flap assembly of the present invention is used in an airfoil which has upper and lower surfaces, a forward end and a rear end, a longitudinal axis and a transverse axis.

There is a mounting structure located at a first lower location at the rear end of the wing. There is also a fore flap and an aft flap. The fore flap has a stowed first position above the mounting structure at the rear end of the wing, and is movable rearwardly to an extended second position. In like manner, the aft flap has a stowed third position above the mounting structure at the rear end of the wing, and is movable rearwardly to an extended fourth position.

A first common link has a first lower portion pivotally connected to the mounting structure at a first pivot location, an intermediate portion pivotally connected to the fore flap at a second pivot location, and an upper portion pivotally connected to the aft flap at a third pivot location. A second link has a first lower portion pivotally connected to the mounting structure at a fourth pivot location spaced longitudinally from the first pivot location, and a second upper portion pivotally connected to the fore flap at a fifth pivot location spaced longitudinally from the second pivot location.

A third link has a first end portion pivotally connected to the aft flap at a sixth pivot location spaced longitudinally from the third pivot location, and a second end having an operative pivot connection at a seventh pivot location to the fore flap. In one arrangement, the seventh pivot connection is made directly to the fore flap, while in yet another arrangement, the seventh pivot location is made to the second link, which is in turn connected to the fore flap.

In one embodiment, the common first link has its first pivot location positioned forwardly of the fourth pivot location of the second link, so that the first and second links form a first four-bar linkage with the first link comprising a forward link portion of the first four-bar linkage. In that embodiment, an upper portion of the first link forms with the third link a second four-bar linkage, with the upper portion of the first link comprising a forward portion of the second four-bar linkage.

In another embodiment, the common fourth link has its first pivot connection located rearwardly of the fourth pivot location of the second link, so that the common first link forms a rear portion of the first four-bar linkage. The upper portion of the common first link forms with the third link a forward portion of the second four-bar linkage.

In yet a third embodiment, the common first link is positioned rearwardly of both the second and third link. Thus, for both the first and second four-bar linkages, the first link forms the rear portion of each.

Desirably, the fore flap has a downwardly extending mounting arm means rigidly attached to the fore flap. The first and second links are attached to the mounting arm means at the second and fifth pivot locations.

For proper motion of the flaps to their deployed positions, in the first embodiment the first and second pivot locations are spaced further from one another than the fourth and fifth pivot locations, in a manner that initial motion of the fore flap from its stowed position toward its extended position is more rearwardly, and final motion to its fully extended position is more downwardly. In like manner, the second and third pivot locations are spaced further from one another than the sixth and seventh pivot locations, so that the initial motion of the aft flap from its stowed position is more rearwardly, while final movement of the aft flap to its fully deployed position is more downwardly. In the second embodiment the spacing between the fourth and fifth pivot locations is greater than the spacing between the first and second pivot locations. In the third embodiment the spacing between the sixth and seventh pivot locations is greater than that between the second and third pivot locations.

Other features of the present invention will become apparent from the following detailed description.

DESCRIPTION OF THE PREFERRED EMBODIMENT

Figure 1:
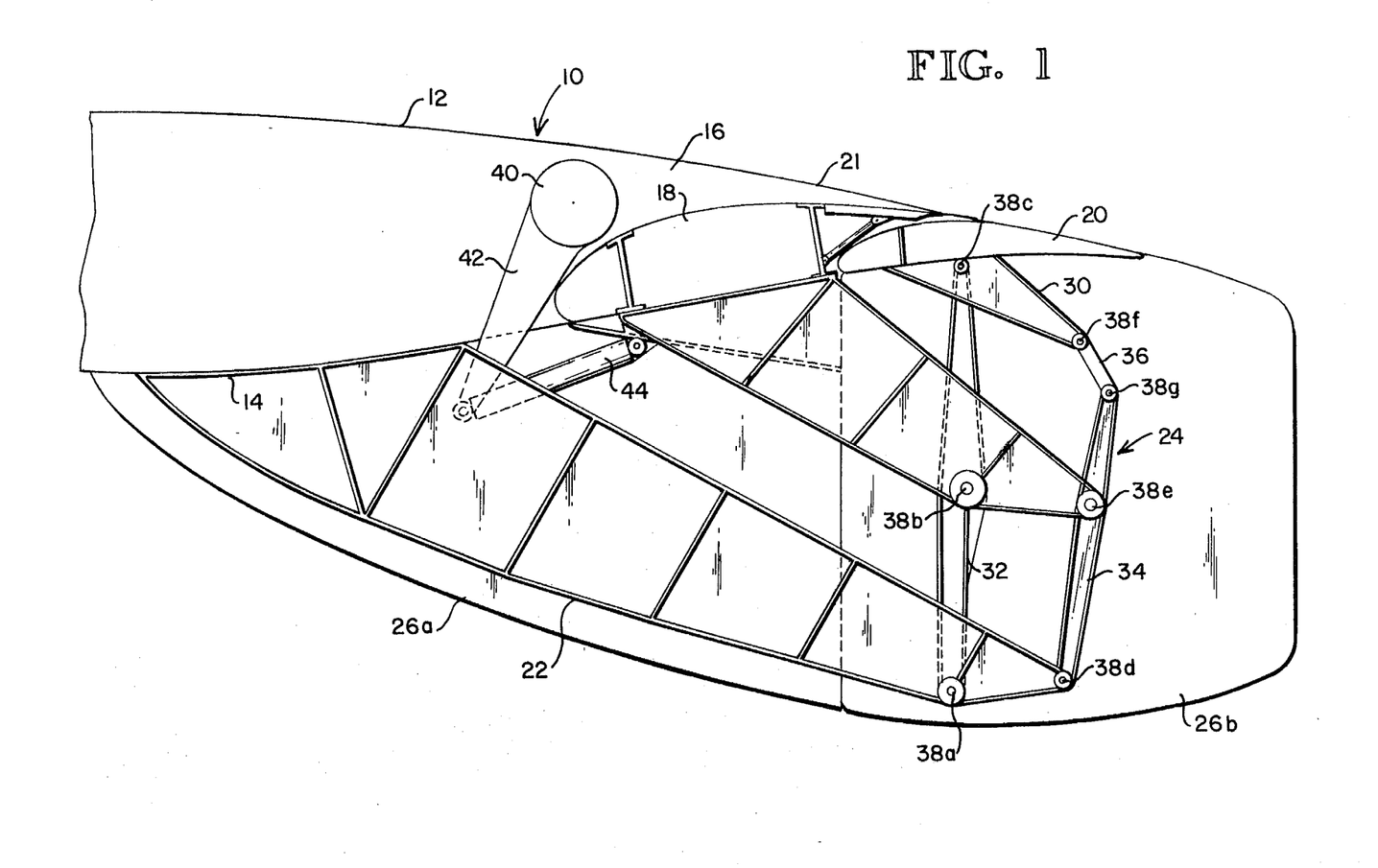
FIG. 1 is a sectional view taken through the rear portion of an airfoil, and showing one unit of the flap system of the present invention.
Figure 2:
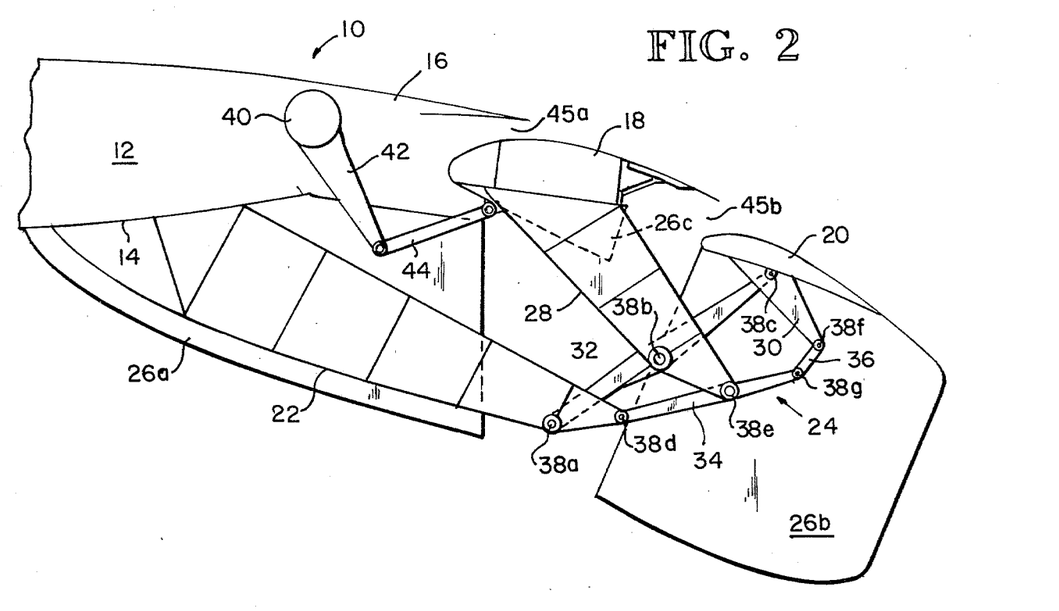
FIG. 2 is a view similar to FIG. 1, showing the flap assembly moderately extended to the position for take-off of the aircraft.
Figure 3:
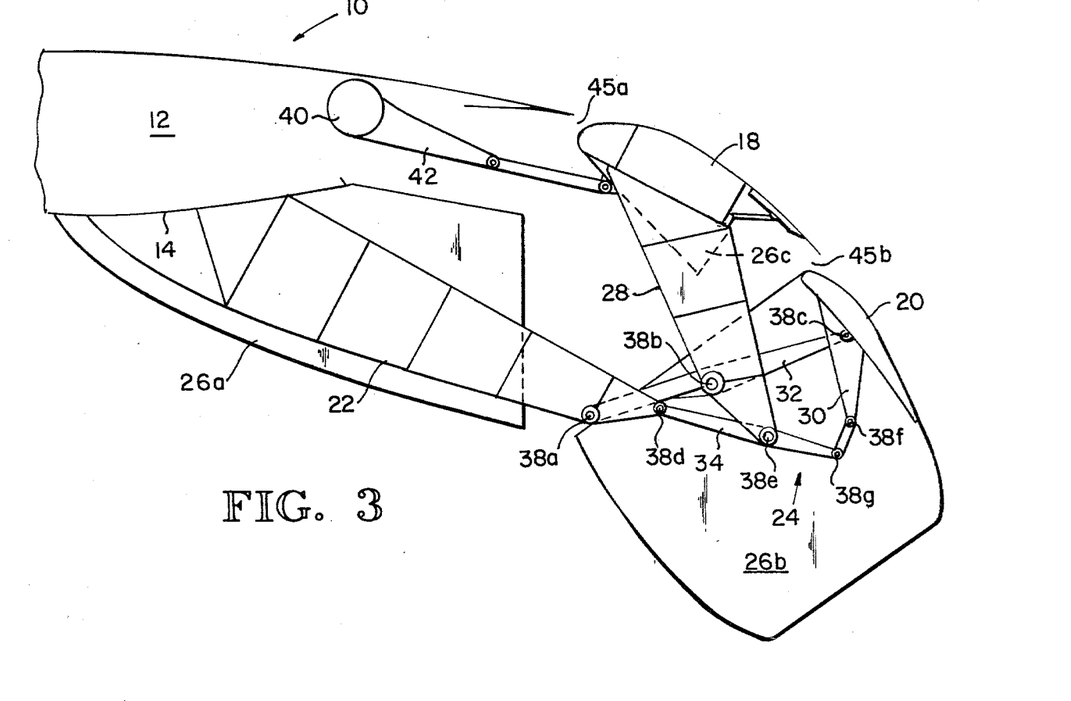
FIG. 3 is a view similar to FIGS. 1 and 2 showing the flap assembly in its fully extended position for landing of the aircraft.

FIGS. 1, 2 and 3 show a rear portion of an airfoil having a flap configuration of a first embodiment of the present invention. It is to be understood that the portion of the flap assembly shown in these figures is at one location along the span of the wing, and there are similar arrangements at spaced locations along the span of the wing.

The wing 10 has an upper surface 12, a lower surface 14, a rear end 16, and a forward end (not shown for ease of illustration). There is a fore flap 18 and an aft flap 20. FIG. 1 shows the two flaps 18 and 20 in their stowed position in the rear end 16 adjacent a cove panel 21 of the wing 10; FIG. 2 shows the flaps 18 and 20 partially extended for take-off of the aircraft; and FIG. 3 shows the flaps 18 and 20 in their fully extended position for landing.

Extended downwardly and rearwardly from the lower rear portion of the wing 10 is a rigid mounting structure 22 which is positioned directly beneath the flaps 18 and 20, when these flaps are in their stowed position of FIG. 1. The flaps 18 and 20 are mounted from a linkage system 24 which is particularly significant in the present invention. The mounting structure 22 and the linkage system 24 are enclosed by a fairing comprising three sections 26a, 26b and 26c. The forward fairing section 26a remains stationary around the forward part of the mounting structure 22; the rear fairing section 26b is attached to and moves with the aft flap 20; and the small upper section 26c is attached to and moves with the fore flap 18.

Extending downwardly and rearwardly from the bottom surface of the fore flap 18 is a fore flap mounting arm 28. There is also an aft flap mounting arm 30 extending downwardly and rearwardly of the lower surface of the aft flap 20.

The linkage system 24 comprises three links, namely a common first link 32, a second link 34 and a third link 36. In this first embodiment, the first link 32 has three pivot connections. There is a first lower connection 38a to the lower rear portion of the main mounting structure 22. There is an intermediate second pivot connection 38b at the lower rear portion of the fore flap mounting arm 28. Finally, there is an upper third pivot connection 38c at the lower surface of the aft flap 20.

In this first embodiment, the second link 34 is positioned rearwardly of the first link 32. The second link 32 has a lower fourth pivot connection 38d at the extreme rear portion of the mounting structure 22, and an upper fifth pivot location 38e at the extreme rear portion of the fore flap mounting arm 28. Finally, the third link 36 has an upper sixth pivot connection 38f at the extreme lower rear end of the aft flap mounting arm 30, and a lower seventh pivot connection 38g with the upper end of the second link 34.

Lower portions of the first link 32 and second link 34 form a four-bar linkage by which the fore flap 18 is movably mounted to the mounting structure 22. In the specific configuration shown herein, with the flaps 18 and 20 in their stowed position, as shown in FIG. 1, the second pivot connection 38b is almost directly above the first pivot connection 38a, and the fifth pivot connection 38e is above and slightly rearwardly of the fourth pivot connection 38d. Also, the distance between the first and second pivot connections 38a and 38b is moderately greater than the distance between the fourth and fifth pivot connections and 38d and 38e. The effect of this is as the fore flap 18 moves initially rearwardly to the take-off position, shown in FIG. 2, the fore flap 18 moves substantially rearwardly with little downward deflection. However, when the fore flap moves further to its fully deployed position for landing, as in FIG. 3, the fore flap 18 moves more toward a downwardly and rearwardly extending position.

The upper portion of the first link 32 forms with the third link 36 and the upper portion of the second link 34 a second four-bar linkage, by which the aft flap 20 is mounted. In this arrangement, the third pivot connection 38c is spaced higher than the sixth and seventh pivot connections 38f and 38g. Also, the distance between the second and third pivot connections 38b and 38c is substantially greater than the distance from the fifth pivot location 38e to either of the pivot locations 38f and 38g. The sixth pivot location 38f is positioned moderately above and forwardly of the seventh pivot connection 38g. With this particular arrangement, the initial movement of the aft flap 20 from its stowed position to the intermediate take-off position, shown in FIG. 2, is rearwardly and moderately downwardly, with little angular deflection of the aft flap 20. However, further rearward movement of aft flap 20 causes the aft flap 20 to deflect angularly downwardly and rearwardly a substantial amount, as shown in FIG. 3.

To move the flaps 18 and 20 between their stowed and deployed positions, there is provide a rotary hinge 40, having a crank arm 42 that is connected to the fore flap 18 by a drive link 44. Counterclockwise rotation of the rotary hinge 40 moves the flap 18 and 20 from the stowed position of FIG. 1 toward the position of FIG. 2 and then to the position of FIG. 3, while opposite rotation of the rotary hinge 40 moves the flaps 18 and 20 toward the stowed position.

An examination of the linkage system 24 of this first embodiment reveals that there is a total of only three links 32, 34 and 36, and only seven pivot connections between the three links, the mounting structure 22 and the flaps 18 and 20. Further, it is readily apparent from an examination of FIG. 1 and 2 that this linkage system 24 provides substantial Fowler motion in deploying the flaps 18 and 20 from the stowed position of FIG. 1 to the take-off position of FIG. 2. Further, the linkage system 24 is so arranged that full deployment of the flaps 18 and 20 to the landing position of FIG. 3 places the flaps 18 and 20 in a near optimum position for landing. Further, as the flaps 18 and 20 move to the positions of FIGS. 2 and 3, slots are opened at 45a and 45b.

Figure 4:
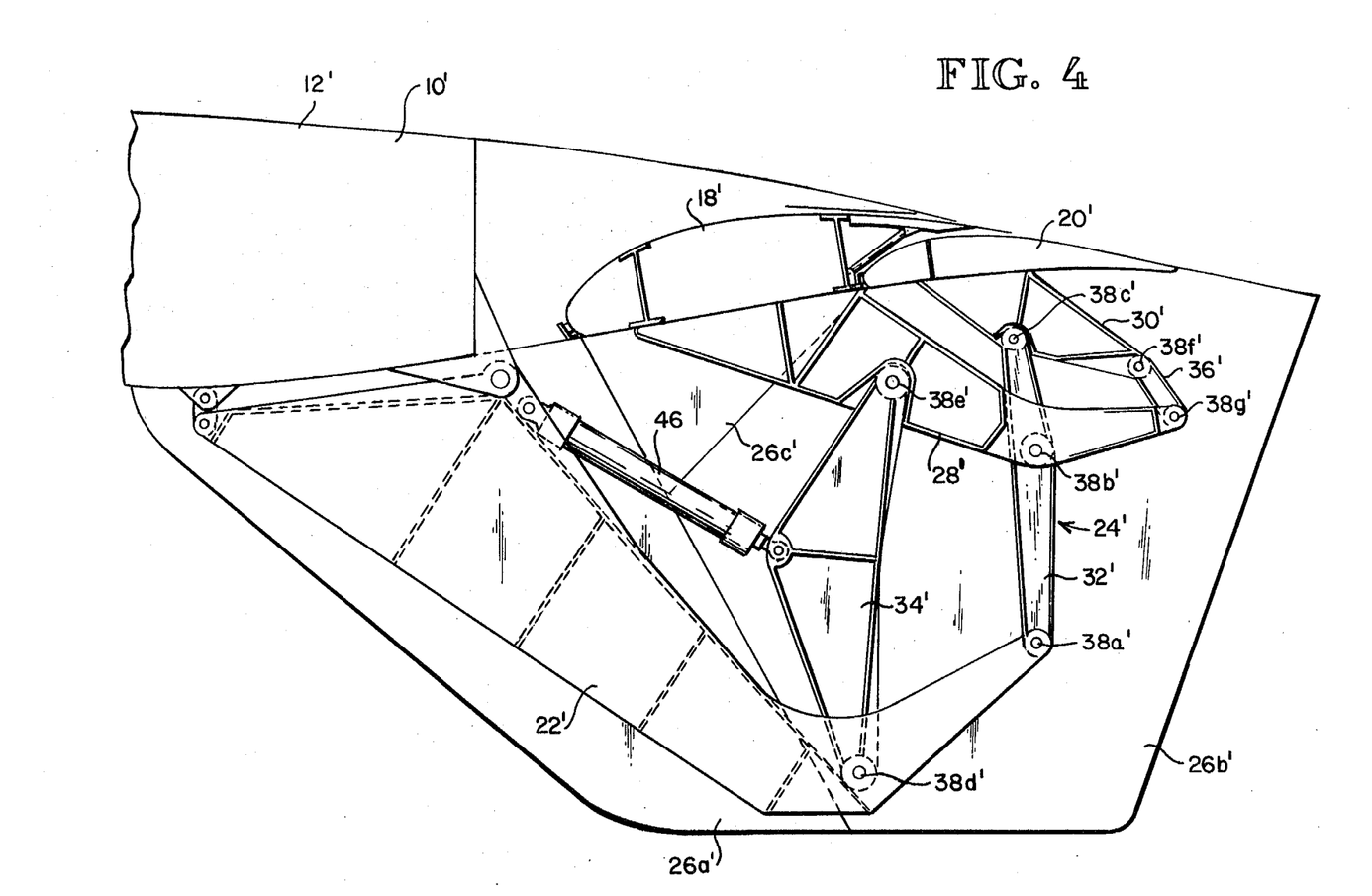
FIG. 4 is a view similar to FIG. 1, showing a flap assembly of a second embodiment of the present invention, in its stowed position.
Figure 5:
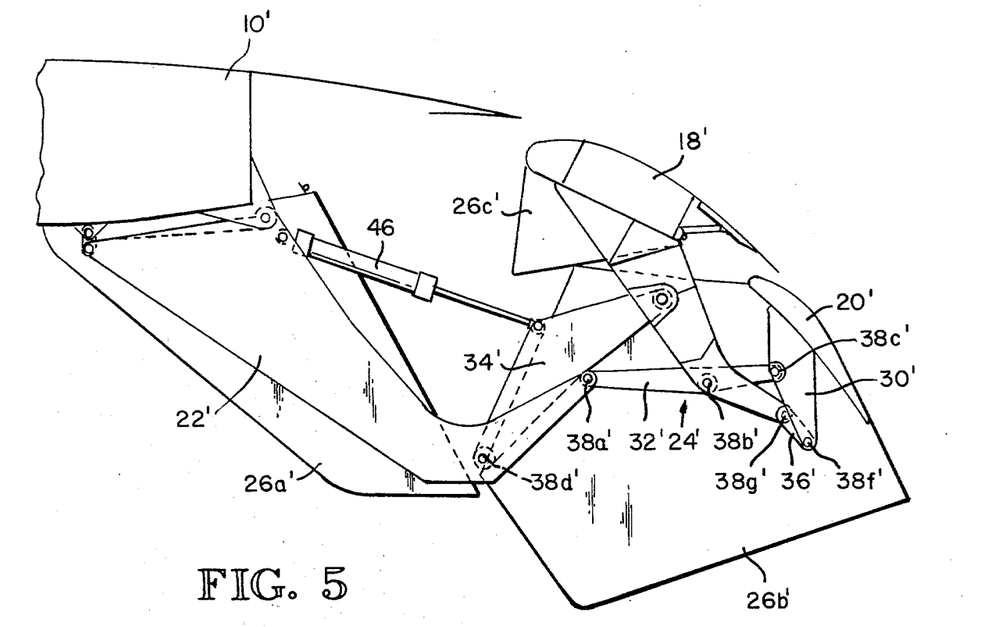
FIG. 5 is a view of the second embodiment of FIG. 1, with the flap assembly in its fully extended position for landing.
Figure 6:
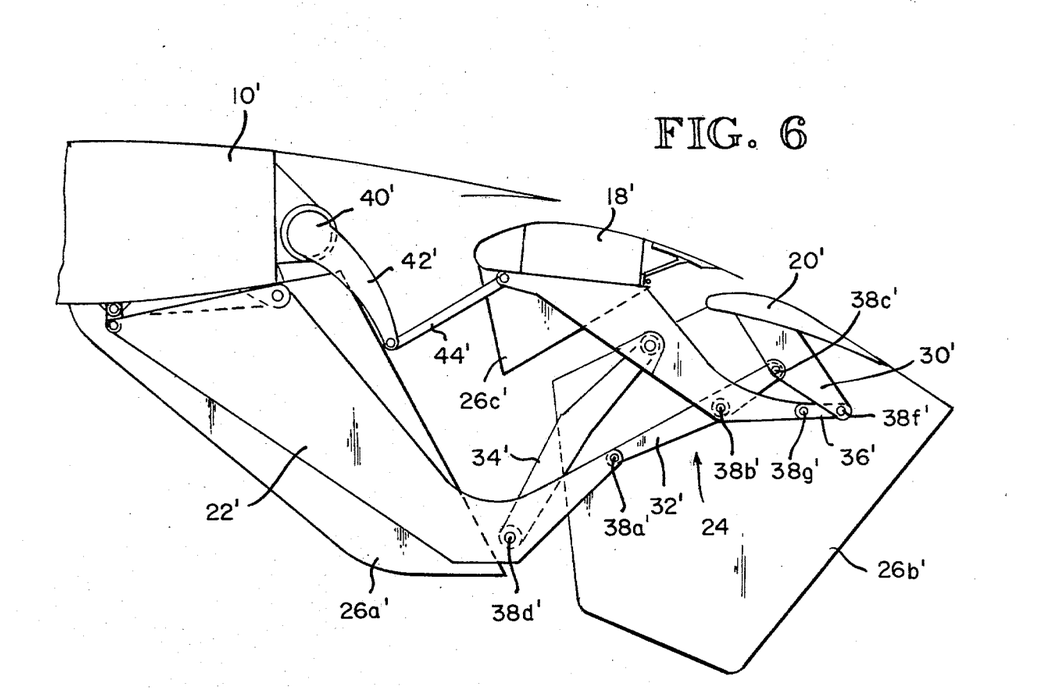
FIG. 6 is a view similar to the preceding views, showing a slightly modified form of the embodiment of FIGS. 4 and 5, and with the flap assembly being in its intermediate deployed position for take-off.

A second embodiment of the present invention is shown in FIGS. 4, 5 and 6. FIG. 4 shows the flaps stowed position, FIG. 5 the landing position and FIG. 6 the take-off position. Components of this second embodiment which are similar to components of the first embodiment will be given like numerical designations, with a prime (') distinguishing those of the second embodiment. Thus, there is the wing 10', fore flap 18', aft flap 20', mounting structure 22' and linkage system 24'. There is also the fore flap mounting arm 28', the aft flap mounting arm 30', and three fairing sections 26a', 26b' and 26c'.

This second embodiment differs from the first embodiment mainly in the manner in which the common first link 32' is positioned relative to the second link 34'. In this second embodiment, the second link 34' is positioned forwardly of the first link 32', so that with the flaps 18' and 20' in the stowed position, the fourth pivot connection 38d' *is located downwardly and forwardly of the first pivot connection 38a'*. The fifth pivot connection 38e' is positioned forwardly of, and moderately above, the second pivot connection 38'b. Thus, the lower four-bar linkage by which the fore flap 18' is mounted to the mounting structure 22' has the second link 34' as its forward link portion and the lower part of the first link 32' as its rear portion.

In this second embodiment, the upper portion of the first link 32' remains positioned forwardly of the third link 36'. However, the seventh pivot connection 39g', is connected directly to the lower rear end portion of the fore flap mounting arm 38. Also, to actuate the flaps 18' and 20' there is provided a hydraulic cylinder and piston unit 46 connected to the second link 34', as shown in FIGS. 4 and 5. The hydraulic cylinder and piston actuation is optional to rotary hinge actuation shown in FIG. 6. Rotary hinge actuation could be used on all three embodiments.

An examination of the second embodiment shown in FIGS. 4, 5 and 6 reveals that the upper and lower four-bar linkages operate in substantially the same manner as the corresponding components in the first embodiment. In other words, the initial rearward motion of the flaps 18' and 20' to the intermediate position is substantially horizontal with little angular deflection as shown in FIG. 6. With further rearward movement of the flaps 18' and 20', the flaps move to the downward and rearwardly extending positions shown in FIG. 5.

An examination of this second embodiment reveals that there is the same relative simplicity of the linkage unit 24', with only seven pivot connections and three links. Further, the desired Fowler motion, and proper positioning at full deflection of the flaps is achieved.

Figure 7:
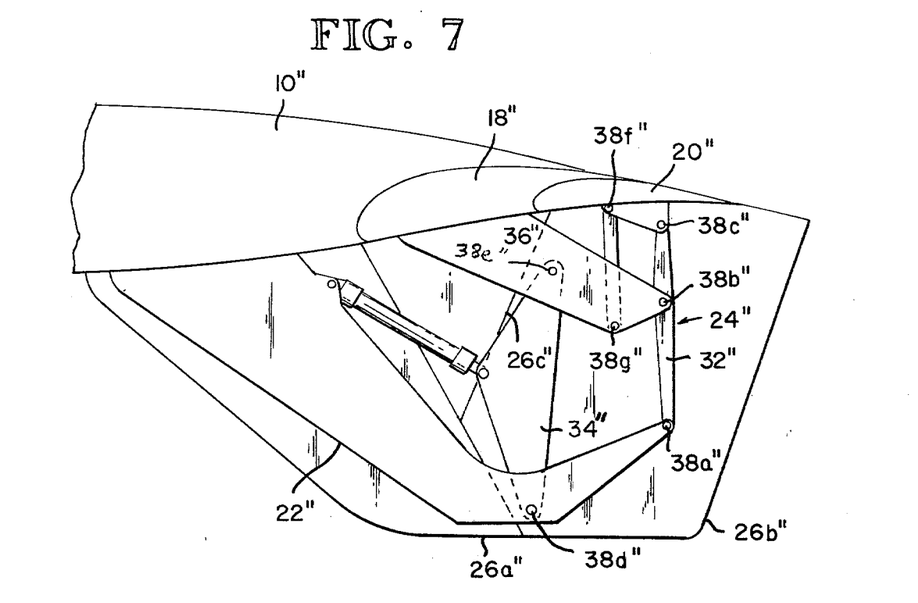
FIG. 7 is a view similar to FIGS. 1 and 4 showing a third embodiment of the present invention, with the flap assembly being in its stowed position.
Figure 8:
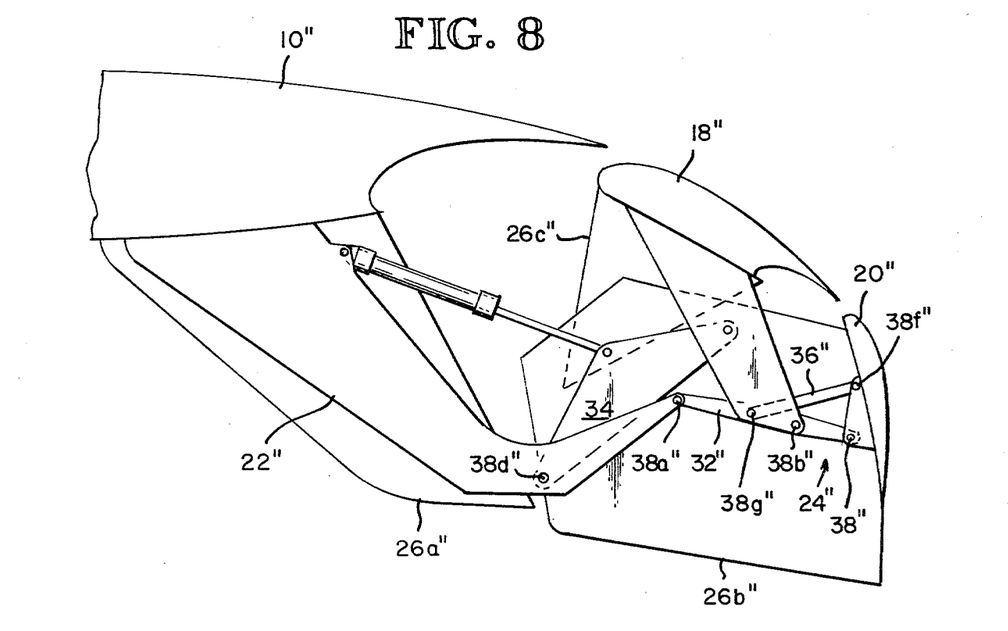
FIG. 8 is a view of the third embodiment of FIG. 7, showing the flap assembly in its fully extended position for landing of the aircraft.

A third embodiment of the present invention is shown in FIGS. 7 and 8. FIG. 7 shows the stowed position and FIG. 8 the landing position. Components of this third embodiment which are similar to components of the first and second embodiments will be given like numerical designations, with a double prime (") distinguishing those of the third embodiment. Thus, there is the wing 10", fore flap 18", aft flap 20", mounting structure 22" and linkage system 24".

The differing features of this third embodiment of FIGS. 7 and 8 is that the first link 32" is positioned rearwardly of both the second link 34" and third link 36". Thus, with the flaps 18" and 20" in the stowed position the fourth pivot connection 38d" is positioned downwardly and forwardly of the first pivot connection 38a", while the fifth pivot connection 38e" is positioned forwardly and moderately above the second pivot connection 38b". The seventh pivot connection 38g" is positioned forwardly of and moderately below the second pivot connection 38b" and the fifth pivot connection 38e". The sixth pivot connection 38g" is positioned moderately above and forwardly of the third pivot connection 38c".

An examination of the linkage system 24" of the third embodiment of FIGS. 7 and 9 makes it readily apparent that there is, as with the first two embodiments, an upper and lower four-bar linkage, with the first link 32" being a common link with the two four-bar linkages. It also becomes readily apparent that the movement of the flaps 18" and 20" from the stowed position toward the deployed position is substantially the same as with the first two embodiments.

The apparatus of the present invention is particularly adapted for use as a trailing edge flap assembly for an aircraft having the particular mission requirements discussed previously under background of the invention.

Now therefore I claim:

1. A flap assembly for an airfoil, said airfoil having upper and lower surfaces, a forward end and a rear end, a longitudinal axis and a transverse axis, said flap assembly comprising:
   a. a mounting structure located at a first lower location at the rear end of the airfoil,
   b. a fore flap having a stowed first position above the mounting structure at the rear end of the airfoil, and movable rearwardly to an extended second position,
   c. an aft flap having a stowed third position above said mounting structure at the rear end of said airfoil, and movable rearwardly to an extended fourth position,
   d. a common first link having a first lower portion pivotally connected to said mounting structure at a first pivot location, an intermediate portion pivotally connected to said fore flap at a second pivot location, and an upper portion pivotally connected to said aft flap at a third pivot location,
   e. a second link having a first lower portion pivotally connected to said mounting structure at a fourth pivot location spaced longitudinally from said first pivot location, and a second upper portion pivotally connected to said fore flap at a fifth pivot location spaced longitudinally from said second pivot location,
   f. a third link having a first end portion pivotally connected top said aft flap at a sixth pivot location spaced longitudinally from said third pivot location, and a second end having an operative pivot connection at a seventh pivot location to said fore flap.

2. The flap assembly as recited in claim 1, wherein the seventh operative pivot connection of the third link is directly to said fore flap.

3. The flap assembly as recited in claim 1, wherein the operative seventh pivot connection of said third link is through said second link to said fore flap.

4. The flap assembly as recited in claim 1, wherein said common first link has its first pivot location positioned forwardly of the fourth pivot location of the second link, whereby the first and second link form a first four-bar linkage with the common first link comprising a forward link portion of the first four-bar linkage.

5. The flap assembly as recited in claim 4, wherein said first and second pivot locations are spaced further from one another than said fourth and fifth pivot locations, whereby initial movement of said fore flap from its stowed position is substantially rearward, while further movement of said fore flap is more downwardly than in the initial movement.

6. The flap assembly as recited in claim 4, wherein said common first link has its third pivot location positioned forwardly of the sixth pivot location of the third link, whereby the first and third link form a second four-bar linkage for said aft flap with an upper portion of the first link forming a forward portion of the second four-bar linkage.

7. The flap assembly as recited in claim 6, wherein said second and third pivot locations are spaced further from one another than the sixth and seventh pivot locations, whereby initial movement of the aft flap from the stowed position is in a more rearward direction, while further movement of the aft flap is more downward relative to the initial movement.

8. The assembly as recited in claim 7, wherein the third link has its operative seventh pivot connection through said second link to said fore flap.

9. The flap assembly as recited in claim 1, wherein said first link has its first pivot location positioned rearwardly of the fourth pivot location of the second link, whereby the first and second links form a first four-bar linkage with the first link comprising a rear link portion of the first four-bar linkage.

10. The flap assembly as recited in claim 9, wherein said first and second pivot locations are spaced closer to one another than said fourth and fifth pivot locations, whereby initial movement of said fore flap from its stowed position is substantially rearwardly, while further movement of said fore flap is more downwardly than the initial movement.

11. The flap assembly as recited in claim 9, wherein said sixth pivot location is spaced rearwardly from said third pivot location, whereby the first and third link form a second four-bar linkage, with the first link forming a forward portion of the second four-bar linkage, and the third link forming a rear portion of the second four-bar linkage.

12. The flap assembly as recited in claim 11, wherein said third and second pivot locations are spaced further from one another and said sixth and seventh pivot locations, whereby initial movement of said aft flap from the stowed position is in a more rearward direction, while further rearward movement of said aft flap is more downward relative to the initial movement.

13. The flap assembly as recited in claim 9, wherein the sixth pivot location of the third link is located forwardly of the third pivot location of the first link, whereby an upper portion of the first link and the third link form a second four-bar linkage, with the upper portion of the first link forming a rear portion of the second four-bar linkage.

14. The flap assembly as recited in claim 13, wherein said second and third pivot locations are spaced closer to one another than the sixth and seventh pivot locations, whereby initial movement of the aft flap from the stowed position is in a more rearward direction, while further rearward movement of said aft flap is more downward relative to the initial movement.

15. The flap assembly as recited in claim 1, wherein said fore flap has a mounting arm means rigidly attached to said fore flap and positioned below said fore flap, said first and second links being pivotally connected to said mounting arm means at the second and fifth pivot locations.

16. The flap assembly as recited in claim 1, wherein the sixth pivot location of the third link is located forwardly of the third pivot location of the first link, whereby an upper portion of the first link and the third link form a four-bar linkage, with the upper portion of the first link forming a rear portion of said four-bar linkage.

17. The flap assembly as recited in claim 16, wherein said second and third pivot location are positioned closer to one another than said sixth and seventh pivot location, so that initial movement of said fore flap from its stowed position is substantially rearward, while further movement of the fore flap is more downwardly than in the initial movement.

18. The flap assembly as recited in claim 1, wherein the sixth pivot location of the third link is located rearwardly of the third pivot location of the first link, whereby an upper portion of the first link and the third link form a four-bar linkage, with the upper portion of the first link forming a forward portion of said four-bar linkage.

19. The flap assembly as recited in claim 1, wherein the third and second pivot locations are spaced further from one another than the sixth and seventh pivot locations, whereby initial movement of the fore flap from its stowed position is substantially rearward, while further movement of the fore flap is more downwardly than in the initial movement.

20. A flap assembly for an airfoil, said airfoil having upper and lower surfaces, a forward end and a rear end, a longitudinal axis and a transverse axis, said flap assembly comprising:
 a. a mounting structure located at a first lower location at the rear end of the airfoil,
 b. a fore flap having a stowed first position above the mounting structure at the rear end of the airfoil, and movable rearwardly to an extended second position,
 c. an aft flap having a stowed third position above said mounting structure at the rear end of said airfoil, and movable rearwardly to an extended fourth position,
 d. a common first link having a first lower portion pivotally connected to said mounting structure at a first pivot location, an intermediate portion pivotally connected to said fore flap at a second pivot location, and an upper portion pivotally connected to said aft flap at a third pivot location,
 e. a second link having first lower portion pivotally connected to said mounting structure at a fourth pivot location spaced longitudinally from said first pivot location, and a second upper portion pivotally connected to said fore flap at a fifth pivot location spaced longitudinally from said second pivot location,
 f. a third link having a first end portion pivotally connected to said aft flap at a sixth pivot location spaced longitudinally from said third pivot location, and a second end having an operative pivot connection at a seventh pivot location to said fore flap,
 g. said common first link having its first pivot location positioned forwardly of the fourth pivot location of the second link, whereby the first and second link form a first four-bar linkage with the common first link comprising a forward link portion of the first four-bar linkage.

21. The flap assembly as recited in claim 20, wherein said first and second pivot locations are spaced further from one another than said fourth and fifth pivot locations, whereby initial movement of said fore flap from its stowed position is substantially rearward, while further movement of said flap is more downward than in the initial movement.

22. The flap assembly as recited in claim 20, wherein said common first link has its third pivot location positioned forwardly of the sixth pivot location of the third link, whereby the first and third link form a second four-bar linkage for said aft flap with an upper portion of the first link forming a forward portion of the second four-bar linkage.

23. The flap assembly as recited in claim 22, wherein said second and third pivot locations are spaced further from one another than the sixth and seventh pivot locations, whereby initial movement of the aft flap from the stowed position is in a more rearwardly direction, while further movement of the aft flap is more downwardly relative to the initial movement.

24. The assembly as recited in claim 23, wherein the third link has its operative seventh pivot connection through said second link to said fore flap.

25. A flap assembly for an airfoil, said airfoil having upper and lower surfaces, a forward end and a rear end, a longitudinal axis and a transverse axis, said flap assembly comprising:
 a. a mounting structure located at a first lower location at the rear end of the airfoil,
 b. a fore flap having a stowed first position above the mounting structure at the rear end of the airfoil, and movable rearwardly to an extended second position,
 c. an aft flap having a stowed third position above said mounting structure at the rear end of said airfoil, and movable rearwardly to an extended fourth position,
 d. a common first link having a first lower portion pivotally connected to said mounting structure at a first pivot location, an intermediate portion pivotally connected to said fore flap at a second pivot location, and an upper portion pivotally connected to said aft flap at a third pivot location,
 e. a second link having a first lower portion pivotally connected to said mounting structue at a fourth pivot location spaced longitudinally from said first pivot location, and a second upper portion pivotally connected to said fore flap at a fifth pivot location spaced longitudinally from said second pivot location, f. a third link having a first end portion pivotally connected to said aft flap at a sixth pivot location spaced longitudinally from said third pivot location, and a second end having an operative pivot connection at a seventh pivot location to said fore flap.

g. said first link having its first pivot location positioned rearwardly of the fourth pivot location of the second link, whereby the first and second links form a first four-bar linkage with the first link comprising a rear link portion of the first four-bar linkage.

26. The flap assembly as recited in claim 25, wherein said first and second pivot locations are spaced closer to one another than said fourth and fifth pivot locations, whereby initial movement of said fore flap from its stowed position is substantially rearward, while further movement of said fore flap is more downward than the initial movement.

27. The flap assembly as recited in claim 25, wherein said sixth pivot location is spaced rearwardly from said third pivot location, whereby the first and third link form a second four-bar linkage, with the first link forming a forward portion of the second four-bar linkage, and the third link forming a rear portion of the second four-bar linkage.

28. The flap assembly as recited in claim 27, wherein said third and second pivot locations are spaced further from one another and said sixth and seventh pivot locations, whereby initial movement of said aft flap from the stowed position is in a more rearward direction, while further rearward movement of said aft flap is more downward relative to the initial movement.

29. The flap assembly as recited in claim 25, wherein the sixth pivot location of the third link is located forwardly of the third pivot location of the first link, whereby an upper portion of the first link and the third link form a second four-bar linkage, with the upper portion of the first link forming a rear portion of the second four-bar linkage.

30. The flap assembly as recited in claim 29, wherein said second and third pivot locations are spaced closer to one another than the sixth and seventh pivot locations, whereby initial movement of the aft flap from the stowed position is in a more rearwardly direction, while further rearward movement of said aft flap is more downwardly relative to the initial movement.

31. A flap assembly for an airfoil, said airfoil having upper and lower surfaces, a forward end and a rear end, a longitudinal axis and a transverse axis, said flap assembly comprising:
   a. a mounting structure located at a first lower location at the rear end of the airfoil,
   b. a fore flap having stowed first position above the mounting structure at the rear end of the airfoil, and movable rearwardly to an extended second position,
   c. an aft flap having a stowed third position above said mounting structure at the rear end of said airfoil, and movable rearwardly to an extended fourth position,
   d. a common first link having a first lower portion pivotally connected to said mounting structure at a first pivot location, an intermediate portion pivotally connected to said fore flap at a second pivot location, and an upper portion pivotally connected to said aft flap at a third pivot location,
   e. a second link having a first lower portion pivotally connected to said mounting structure at a fourth pivot location spaced longitudinally from said first pivot location, and a second upper portion pivotally connected to said fore flap at a fifth pivot location spaced longitudinally from said second pivot location,
   f. a third link having a first end portion pivotally connected to said aft flap at a sixth pivot location spaced longitudinally from said third pivot location, and a second end having an operative pivot connection at a seventh pivot location to said fore flap,
   g. the sixth pivot location of the third link being located forwardly of the third pivot location of the first link, whereby an upper portion of the first link and the third link form a four-bar linkage, with the upper portion of the first link forming a rear portion of said four-bar linkage.

32. The flap assembly as recited in claim 31, wherein said second and third pivot location are positioned closer to one another than said sixth and seventh pivot location, so that initial movement of said fore flap from its stowed position is substantially rearward, while further movement of the fore flap is more downward than in the initial movement.

33. A flap assembly for an airfoil, said airfoil having upper and lower surfaces, a forward end and a rear end, a longitudinal axis and a transverse axis, said flap assembly comprising:
   a. a mounting structure located at a first lower location at the rear end of the airfoil,
   b. a fore flap having a stowed first position above the mounting structure at the rear end of the airfoil, and movable rearwardly to an extended second position,
   c. an aft flap having a stowed third position above said mounting structure at the rear end of said airfoil, and movable rearwardly to an extended fourth position,
   d. a common first link hvaing a first lower portion pivotally connected to said mounting structure at a first pivot location, an intermediate portion pivotally connected to said fore flap at a second pivot location, and an upper portion pivotally connected to said aft flap at a third pivot locations,
   e. a second link having a first lower portion pivotally connected to said mounting structure at a fourth pivot location spaced longitudinally from said first pivot location, and a second upper portion pivotally connected to said fore flap at a fifth pivot location spaced longitudinally from said second pivot location,
   f. a third link having a first end portion pivotally connected to said aft flap at a sixth pivot location spaced longitudinally from said third pivot location, and a second end having an operative pivot connection at a seventh pivot location to said fore flap,
   g. the sixth pivot location of the third link being located rearwardly of the third pivot location of the first link, whereby an upper portion of the first link and the third link form a four-bar linkage, with the upper portion of the first link forming a forward portion of said four-bar linkage.

34. The flap assembly as recited in claim 33, wherein the third and second pivot locations are spaced further from one another than the sixth and seventh pivot locations, whereby initial movement of the fore flap from its stowed position is substantially rearward, while further movement of the fore flap is more downwardly than in the initial movement.

* * * * *